(12) United States Patent
Sukhman et al.

(10) Patent No.: US 7,947,919 B2
(45) Date of Patent: May 24, 2011

(54) LASER-BASED MATERIAL PROCESSING EXHAUST SYSTEMS AND METHODS FOR USING SUCH SYSTEMS

(75) Inventors: Yefim P. Sukhman, Scottsdale, AZ (US); Christian J. Risser, Scottsdale, AZ (US); Carlos Alzate, Maricopa, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 673 days.

(21) Appl. No.: 12/042,162

(22) Filed: Mar. 4, 2008

(65) Prior Publication Data

US 2009/0223944 A1 Sep. 10, 2009

(51) Int. Cl.
*B23K 26/16* (2006.01)
(52) U.S. Cl. .......... 219/121.67; 219/121.76; 219/121.84
(58) Field of Classification Search ............ 219/121.63–121.72, 121.76, 121.82–121.85; 156/272.8; 264/482
See application file for complete search history.

(56) References Cited

U.S. PATENT DOCUMENTS

| | | | |
|---|---|---|---|
| 3,524,038 A | | 8/1970 | O'Kelly Jr. |
| 3,769,433 A * | | 10/1973 | Hasslinger .................... 514/722 |
| 3,866,398 A | | 2/1975 | Vernon, Jr. et al. |
| 4,223,201 A * | | 9/1980 | Peters et al. ............. 219/121.63 |
| 4,315,133 A | | 2/1982 | Morgan et al. |
| 4,675,497 A * | | 6/1987 | Pearl et al. ............... 219/121.67 |
| 5,049,723 A * | | 9/1991 | Macdonald .............. 219/121.83 |
| 5,262,613 A * | | 11/1993 | Norris et al. ............. 219/121.68 |
| 5,264,026 A * | | 11/1993 | Paul ................. 95/268 |
| 5,359,176 A * | | 10/1994 | Balliet et al. ............ 219/121.84 |
| 5,365,816 A * | | 11/1994 | Rudy ............................. 83/177 |
| 5,485,935 A | | 1/1996 | Foltz et al. |
| 5,635,086 A * | | 6/1997 | Warren et al. ............ 219/121.39 |
| 5,730,817 A * | | 3/1998 | Feygin et al. .................... 156/64 |
| 5,780,806 A * | | 7/1998 | Ferguson et al. ........ 219/121.68 |
| 5,906,760 A * | | 5/1999 | Robb et al. ............... 219/121.67 |
| 5,973,764 A | | 10/1999 | McCullough et al. |
| 6,097,417 A * | | 8/2000 | Richardson et al. .......... 347/225 |
| 6,144,010 A | | 11/2000 | Tsunemi et al. |
| 6,229,112 B1 | | 5/2001 | Scott et al. |
| 6,326,590 B1 | | 12/2001 | Shaffer et al. |
| 6,376,798 B1 | | 4/2002 | Remue et al. |
| 6,384,372 B1 | | 5/2002 | Sritulanont et al. |
| 6,388,228 B1 | | 5/2002 | Lai |
| 6,507,000 B2 | | 1/2003 | Otsubo et al. |
| 6,531,682 B1 | | 3/2003 | Guttler et al. |
| 6,576,871 B1 | | 6/2003 | Jendick et al. |
| 6,723,952 B2 | | 4/2004 | Choo et al. |
| 7,044,610 B2 | | 5/2006 | Beyer et al. |
| 7,062,845 B2 | | 6/2006 | Burgess |
| 7,834,293 B2 * | | 11/2010 | Wile et al. ................ 219/121.69 |
| 2007/0107252 A1 | | 5/2007 | Kruckenhauser et al. |

* cited by examiner

*Primary Examiner* — Samuel M Heinrich
(74) *Attorney, Agent, or Firm* — Perkins Coie LLP (57) ABSTRACT

Laser-based material processing systems, exhaust systems, and methods for using such systems are disclosed herein. One embodiment of a laser-based material processing system can include an exhaust assembly configured to remove contaminants from a material processing area. The exhaust assembly can include a vacuum source and an exhaust plenum carried by a moveable arm of a gantry-style laser beam positioning assembly. The moveable arm can extend along a first axis and can be moveable along a second axis generally normal to the first axis. The exhaust plenum can extend lengthwise in a direction generally parallel with the first axis. The exhaust assembly can also include an intake slot extending lengthwise along the exhaust plenum across at least a portion of the material processing area. The exhaust assembly can further include one or more flexible exhaust ducts in fluid communication with the vacuum source and the exhaust plenum.

14 Claims, 5 Drawing Sheets

LASER-BASED MATERIAL PROCESSING EXHAUST SYSTEMS AND METHODS FOR USING SUCH SYSTEMS

TECHNICAL FIELD

The present disclosure is directed generally toward laser-based material processing exhaust systems and methods for using such systems.

BACKGROUND

Lasers are ubiquitous devices used for testing, measuring, printing, cutting, marking, medical applications, communications, data transmission, semiconductor processing, and a number of other applications. Many types of lasers have been developed to meet different performance criteria for different applications. Engraving, cutting, marking, printing, and many other applications require relatively compact lasers that generate high power outputs and have beams with a desired shape and energy distribution. Laser-based processing systems, for example, can mark, cut, weld, or perform other types of surface modifications of material for a variety of different applications.

Commonly, laser-based material processing systems have a gantry motion system for moving the laser beam across a material processing area. For example, the motion system can include a moveable arm orientated along an X-axis and configured to travel along a Y-axis of movement by sliding along a pair of Y-axis orientated rails. Optical elements positioned along one of the rails and the moveable arm are configured to capture and redirect a laser beam from a stationary laser source toward a focus carriage that is attached to and moves along the moveable arm to position the focused laser beam at a desired point along the X-axis. The focus carriage typically houses additional optical elements configured to capture and redirect the laser beam toward the material processing area. Accordingly, the gantry motion system arrangement allows the laser beam to be directed to any position within an X-Y field of motion via movement of the arm along the Y-axis and movement of the focus carriage along the arm.

When the focused laser beam irradiates the surface of a target material (i.e., wood, plastic, leather, coated metals, etc.), such as for cutting patterns or engraving images, fumes, particulates, smoke, debris, etc. (i.e., contaminants) are generated at the site of irradiation. If not evacuated, these contaminants can negatively affect and/or damage both the optic and motion system components described above. Accordingly, such contaminants should be extracted from the site of material processing. In some conventional systems, the contaminants are vented away from the processing area, while in other conventional systems, the contaminants are filtered from the air to prevent damage to the system, as well as to prevent exposure to the system operator and/or other bystanders.

Conventional exhausting systems in laser-based material processing applications, for example, typically include enclosing the material processing area and system components in a common housing and then venting the housing low-pressure, high-volume vacuum exhaust blowers. For example, an exhaust manifold connected to an externally located exhaust blower can be positioned along one wall of the housing (i.e., along the X-axis) and a fresh air intake slot can be formed in a wall of the housing opposite of the exhaust manifold. Operation of the exhaust blower produces a negative pressure volume which can direct a so-called "curtain of moving air" across the surface of the material being processed. The laminar air flow produced should be as wide as the motion system field of travel to effectively remove the contaminants. Accordingly, the exhaust blowers must be able to move large volumes of air in order to effectively exhaust all smoke generated during material processing.

Additional exhausting systems can include a flexible exhaust hose directly attached to the focus carriage. In such systems, the exhaust hose moves with the focus carriage during material processing. The nozzle of the exhaust hose is typically orientated proximal to the point of laser irradiation, thereby removing contaminants directly from their point of generation. Such exhaust systems generally rely on exhaust blowers that create higher vacuum pressure but lower air flow for achieving increased exhaust velocities to capture the contaminants quickly before dispersion. Other known arrangements include exhaust systems designed to remove contaminants through a base structure positioned below the material processing area. However, these systems are only effective when cutting through a workpiece. If images are engraved on the surface of the workpiece, for example, these exhaust systems are not effective.

DETAILED DESCRIPTION

A. Overview

The present disclosure is directed generally toward laser-based material processing systems including an exhaust assembly. The exhaust assembly can be configured to remove contaminants from a material processing area. One embodiment of an exhaust assembly can include a vacuum source and an exhaust plenum. The exhaust plenum can be carried by a moveable arm of a gantry-style laser beam positioning assembly. The moveable arm can extend along a first axis and can be moveable along a second axis generally normal to the first axis. The exhaust plenum can extend lengthwise in a direction generally parallel with the first axis. The exhaust assembly can also include an intake slot in the exhaust plenum. The intake slot can extend lengthwise along the exhaust plenum across at least a portion of the material processing area. The exhaust assembly can further include one or more flexible exhaust ducts in fluid communication with the vacuum source and the exhaust plenum.

In another embodiment, the laser-based material processing system can include a radiation source configured to produce a laser beam and direct the laser beam along a beam path toward a material processing area. The system can also include a positioning assembly over at least a portion of the material processing area. The positioning assembly can include an arm configured to move along a Y axis, wherein the arm extends along an X axis generally normal to the Y axis. The system can further include a laser beam focus carriage carried by the arm and including one or more optical elements in the beam path to direct and focus the laser beam toward the material processing area. The system can also include an exhaust assembly configured to remove contaminants from the material processing area and move the contaminants toward a remote location.

In one embodiment, the exhaust assembly can include a vacuum source and an exhaust plenum carried by the arm and extending lengthwise in a direction generally parallel with the X axis. The exhaust plenum can have an intake slot facing the laser beam focus carriage and extending along the exhaust plenum across at least a portion of the material processing area. The intake slot can be positioned to receive contaminants generated during material processing. The exhaust assembly can also include one or more flexible exhaust ducts in fluid communication with the vacuum source and the exhaust plenum.

The present disclosure is also directed generally toward laser-based material processing exhaust systems and methods for using such systems. One embodiment of an exhausting system for use during laser material processing, for example, can include an exhaust assembly configured to remove contaminants from a portion of a material processing area. The exhaust assembly can include an exhaust chamber carried by a moveable arm of a gantry-style laser beam positioning assembly, and an intake slot extending lengthwise along at least a portion of the exhaust chamber. Additionally, the exhaust assembly can be configured to (a) supply vacuum-assisted laminar air flow across the portion of the material processing area, (b) draw contaminants into the exhaust chamber through the intake slot, (c) remove contaminants from the exhaust chamber, and (d) transport the contaminants toward a vacuum source. In one embodiment, the exhaust chamber can be positioned by the gantry-style support assembly to be at least proximate to the portion of the material processing area.

Several embodiments of the invention are also directed toward methods for exhausting a material processing area of a laser-based material processing system. For example, one embodiment of such a method can include supporting a moveable exhaust plenum over the material processing area and adjacent to a selected region for laser-based material processing using a gantry-style positioning assembly. In one embodiment, the positioning assembly can have an arm configured to move along a first axis and extend along a second axis generally normal to the first axis. The moveable exhaust plenum can be carried by the arm and extend lengthwise in a direction generally parallel with the second axis. The method can further include supplying vacuum-assisted laminar flow from the selected region of the material processing area with a vacuum source. The vacuum source can be in fluid communication with the moveable exhaust plenum. Additionally, the method can include drawing contaminants into the moveable exhaust plenum through an intake slot and into a vacuum-maintained plenum chamber. In one embodiment, the intake slot extends along the exhaust plenum across approximately the entire material processing area. The method can further include removing the contaminants from the plenum chamber and transporting the contaminants to the vacuum source through flexible exhaust ducts. The flexible exhaust ducts can be operably coupled to the arm and configured to move with the exhaust plenum along the first axis.

Many specific details of certain embodiments of the disclosure are set forth in the following description and in FIGS. 1A-3 to provide a thorough understanding of these embodiments. A person skilled in the art, however, will understand that the disclosure may be practiced without several of these details or additional details can be added to the invention. Well-known structures and functions have not been shown or described in detail to avoid unnecessarily obscuring the description of the embodiments of the disclosure. Where the context permits, singular or plural terms may also include the plural or singular term, respectively. Moreover, unless the word "or" is expressly limited to mean only a single item exclusive from the other items in reference to a list of two or more items, the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

Figure 1A:
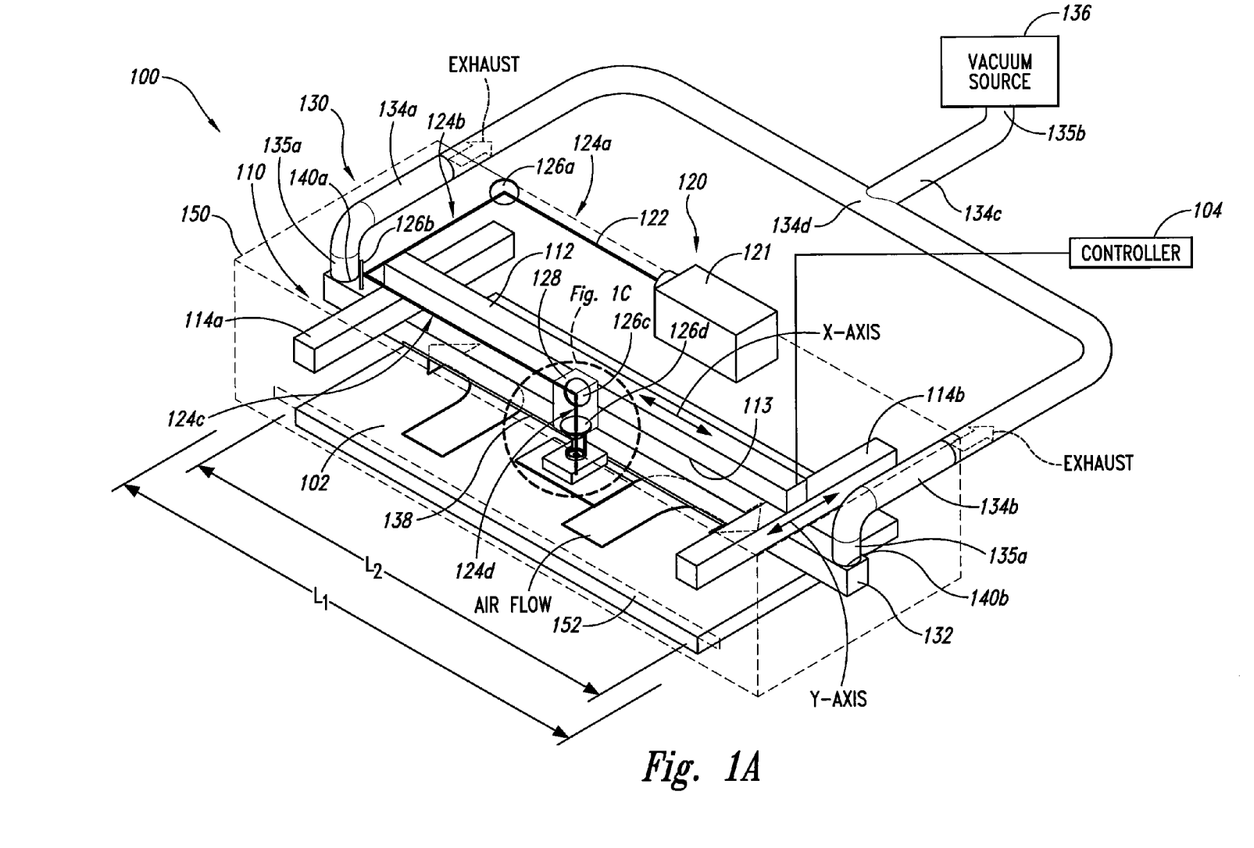
FIG. 1A is a partially schematic, isometric view illustrating a laser-based material processing system including an exhaust assembly configured in accordance with an embodiment of the disclosure.

B. Embodiments of Laser-Based Material Processing Exhaust Systems and Methods for Using Such Systems FIG. 1A is a partially schematic, isometric view of a laser-based material processing system 100 configured in accordance with an embodiment of the disclosure. The laser processing system 100 includes a positioning assembly or support assembly 110 over at least a portion of a material processing area 102. The system 100 also includes (a) a laser assembly 120 configured to direct a laser or radiation beam 122 along a beam path 124 (shown together as 124a-c) toward the material processing area 102, and (b) an exhaust assembly 130 configured to exhaust fumes, particulates, smoke, debris, etc. (referred to herein collectively as "contaminants") generated during processing of a workpiece (not shown) positioned at least proximate to the material processing area 102.

In the illustrated embodiment, the positioning assembly 110 includes a gantry having a movable arm 112 carried by two generally parallel, stationary rails or guides 114 (shown as a first rail 114a and a second rail 114b). The moveable arm 112 extends along a first axis X and the two rails 114a and 114b each extend along a second axis Y generally normal to the first axis X. In this way, the moveable arm 112 can move back and forth along the rails 114a and 114b in a direction generally parallel with the second axis Y to a desired location with respect to the material processing area 102. In other embodiments, such as the embodiment described below with respect to FIG. 3, the positioning assembly 110 can have different configurations and/or include different features.

The laser assembly 120 includes a laser source 121 configured to emit the laser beam 122 with a desired configuration (i.e., size, shape, energy distribution, etc.). The laser source 121 can be any of a variety of radiation sources known in the art, such as a gas laser, a solid state laser, a semiconductor laser, a dye laser, a fiber laser, or a combination of these lasers. In other embodiments, the laser source 121 can also include other types of suitable laser systems and/or lamps. The nature of the source depends upon the intended application. For example, in systems 100 used for material marking, the laser source 121 can be a carbon dioxide gas laser or an Nd:YAG laser. In still further embodiments, the system 100 can include more than one laser source 121.

The laser beam 122 is directed along beam paths 124a-c using optical elements 126a and 126b. The optical elements 126a and 126b can include lenses, mirrors, or other suitable optical members that redirect and/or condition the laser beam 122 as it travels along the beam paths 124a-c. In other embodiments, the laser assembly 120 can include a different number of optical elements 126 and/or the optical elements 126 can have a different arrangement along the beam paths 124a-c.

The laser assembly 120 also includes a laser beam focus carriage 128 (shown schematically in broken lines) moveably carried by the moveable arm 112 of the positioning assembly 110 along the second axis Y. The focus carriage 128 is also moveable along the first axis X by sliding along the arm 112. The focus carriage 128 includes one or more additional optical elements 126 (two are shown as optical elements 126c and 126d) to direct the laser beam 122 from beam path 124c along a beam path 124d toward a desired portion of the material processing area 102. Additionally, the one or more additional optical elements 126 can include a focusing element 126d positioned to focus the laser beam 122 toward the material processing area 102. Accordingly, the focus carriage 128 can focus and direct the laser beam 122 at desired X and Y coordinates on the material processing area. In other embodiments, the focus carriage 128 can include a different number of optical elements 126 and/or the optical elements can have a different arrangement.

The material processing area 120 can be at a desired location relative to the positioning assembly 110. A workpiece (not shown) can be positioned at least proximate to the material processing area 120 for processing (e.g., cutting, marking, welding, etching, etc.). The term "workpiece" is defined herein as any type of material by itself or in combination with one or more additional materials that can be irradiated, modified, manipulated, or otherwise affected by a radiation beam. In several embodiments, for example, the workpiece can include a generally nonporous material, such as metal, wood, plastic, rubber, and/or other suitable materials.

In the illustrated embodiment, the system 100 is contained within a housing 150 (shown in broken lines). The housing 150 can be any type of suitable enclosure for holding the various components of the system 100 described previously. In the embodiment illustrated in FIG. 1A, the housing 150 includes an external air slot 152 disposed in a wall of the housing 150. The external air slot 152 extends a length $L_1$ along the wall of the housing 150. The external air slot 152 is substantially parallel with the moveable arm 112 extending along the axis X. In other embodiments, the external air slot can have other configurations. For example, the housing 150 may include a plurality of air slots formed in the wall of the housing 150. In still other embodiments, the housing 150 may have a different configuration or the housing may be excluded altogether.

Figure 1B:
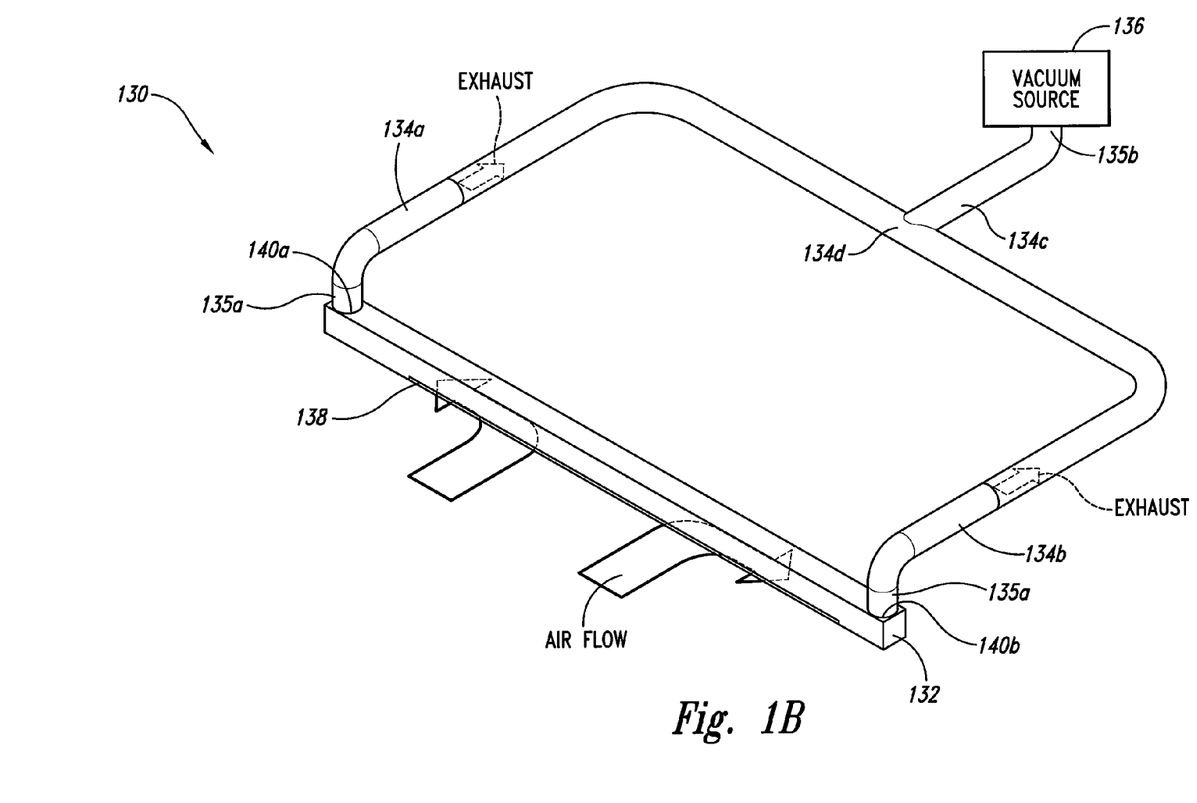
FIG. 1B is a partially schematic, isometric view illustrating the exhaust assembly of FIG. 1A with a number of the laser-based material processing system components removed for purposes of illustration.

The system 100 also includes the exhaust assembly 130 configured to remove contaminants along an exhaust path. The contaminants may be generated when the laser beam 122 is used to modify a workpiece (not shown). FIG. 1B is a partially schematic, isometric view illustrating the exhaust assembly 130 of FIG. 1A with a number of the laser-based material processing system components removed for purposes of illustration. Referring to FIGS. 1A and 1B together, the exhaust assembly 130 can include (a) an exhaust plenum 132 carried by the moveable arm 112 of the positioning assembly 110, (b) one or more flexible exhaust ducts 134, and (c) a vacuum source 136 (shown schematically) external to the housing 150 and configured to create negative air pressure at least proximate to the material processing area 102.

In one embodiment, the arm 112 can have an upper portion 111 facing away from the material processing area 102 and a lower portion 113 facing the material processing area 102. In some embodiments, the exhaust plenum 132 is coupled to the lower portion 113 of the moveable arm 112 above the material processing area 102. For example, the exhaust plenum 132 can be welded to the arm 112. In other embodiments, the exhaust plenum 132 can be releaseably attached to the arm 112 with fasteners, etc. Moreover, the exhaust plenum 132 may have a different arrangement relative to the arm 112. For example, in another embodiment, the exhaust plenum 132 may be carried by the two generally parallel, stationary rails 114a and 114b. In this arrangement, the exhaust plenum 132 can be moveable with respect to the two rails 114a and 114b and along the second axis Y to a desired location with respect to the material processing area 102. Further, in this arrangement, the arm 112 and the exhaust plenum 132 may be independently moveable along the second axis Y.

In one embodiment, the exhaust plenum 132 can be a generally rectangular exhaust chamber having an intake slot 138 extending through a wall of the exhaust chamber facing the focus carriage 128 and positioned to receive a laminar flow of air drawn from the material processing area 102. In one embodiment, the intake slot 138 can have a length $L_2$ along the exhaust plenum 132. The length $L_2$ can correspond, for example, to the length of travel of the focus carriage 128 along the arm 112 such that the exhaust plenum 132 can capture contaminants at any point along a laser beam processing path. One of ordinary skill in the art will recognize that the exhaust plenum 132 can have other configurations and/or shapes (e.g., circular, triangular, etc.). For example, the size and shape of the exhaust plenum 132 may be determined, at least in part, by the size and shape of the positioning assembly 110 and a workpiece thickness. In a specific example, the distance between the positioning assembly 110 and a workpiece (not shown) may be 2 inches, and the exhaust plenum 132 accordingly operates within the 2 inch gap.

The exhaust plenum 132 can be positioned at a selected distance above the material processing area 102 and/or the workpiece (not shown). For example, the exhaust plenum 132 can be attached to the arm 112 such that the exhaust plenum is positioned approximately ⅛ inch to approximately ¼ inch from the surface of the workpiece and/or the material processing area 102. Accordingly, the exhaust plenum 132 can move with the arm 112 without affecting the surface of the workpiece during processing. In other embodiments, the exhaust plenum 132 can be positioned closer or farther from the material processing area 102. In some arrangements, the position of the exhaust plenum 132 relative to the material processing area 102 can be alterable before or during material processing.

The exhaust plenum 132 can be in fluid communication with the vacuum source 136 such that the contaminants can be extracted from the material processing area 102, through the intake slot 138, and into an internal chamber (not shown) of the exhaust plenum 132. The vacuum created by the vacuum source 136 can draw the contaminants through the intake slot 138 before the contaminants rise or otherwise disperse within the system 100. Additionally, the negative vacuum pressure is used to draw the contaminants toward the vacuum source 136, which is typically located at a location external to the housing 150.

In one embodiment, the exhaust plenum 132 is configured with one or more duct attachment sites 140 (shown individually as 140a and 140b) for receiving the one or more flexible exhaust ducts 134 (shown individually as 134a and 134b). As illustrated in FIGS. 1A and 1B, the duct attachment sites 140a and 140b can be on opposite ends 141a and 141b, respectively, of the exhaust plenum 132 proximate to the position at which the rails 114a and 114b carry the moveable arm 112. While FIGS. 1A and 1B illustrate the exhaust assembly 130 having two flexible exhaust ducts 134 (attached to two duct attachment sites 140a and 140b on the exhaust plenum 132), one of ordinary skill in the art will recognize that the exhaust assembly 130 can have one flexible exhaust duct 134 attached to the exhaust plenum 132. In still other embodiments, the system 100 can include a different number of exhaust ducts 134.

The flexible exhaust duct 134 can be a hollow tube or hose having a first duct end 135a configured to attach to the duct attachment site 140a. A second duct end 135b can be in communication with the vacuum source 136. In one arrangement, for example, the flexible exhaust ducts 134a and 134b converge to a single duct 134c prior to the second duct end 135b connection at the vacuum source 136. Moreover, the flexible exhaust ducts 134a and 134b can be in fluid communication at a duct junction 134d and/or the site of convergence of the exhaust ducts 134a and 134b. The duct junction 134d can be positioned in the exhaust path before the vacuum source 121.

In one embodiment, the flexible exhaust ducts 134 can permit the exhaust plenum 132 to travel with the moveable arm 112 as the arm moves along the second axis Y. For example, the flexible exhaust ducts 134 can be formed of elongated flexible tubing (e.g., plastic, rubber, etc.) capable of maintaining a negative pressure generated by the vacuum source 136. Additionally, the flexible exhaust ducts 134 can be formed of lightweight, expandable, and/or collapsible material capable of bending, collapsing, etc. such that the arm 112 is not retrained or otherwise impeded from movement along the second axis Y during material processing. Accordingly, a motor (not shown) used to transition the arm 112 along the second axis Y must be powerful enough to also move the exhaust ducts 134.

The flexible exhaust duct 134 permits fluid communication between the external vacuum source 136 and the exhaust plenum 132 inside the housing 150. The flexible exhaust ducts 134a and 134b cooperate with the vacuum pressure generated by the vacuum source 136 to create a high-velocity laminar air flow across the material processing area 102 from the external air slot 152 to the movable exhaust plenum 132, and to accelerate the air flow upward through the flexible exhaust ducts 134a and 134b and to the vacuum source 136. The contaminants generated at a point of laser processing can be quickly and locally drawn away from the material processing area 102 and away from the optical and moving components in the system 100.

In one embodiment, the vacuum source 136 can be an exhaust blower or other air pump configured to pull air from inside the housing 150, through the intake slot 138, the chamber of the exhaust plenum 132, and the flexible exhaust ducts 134. In one embodiment, the vacuum source 136 can be a low-pressure, high volume exhaust blower. In some embodiments, not shown, the exhaust system 130 can include additional air filters, air purifiers, and/or scrubbers for cleaning the air prior to release of the air into the environment.

One of ordinary skill in the art will recognize that the exhaust assembly 130 is configured to maintain sufficient negative vacuum pressure and to maintain consistent air flow speeds to ensure even and well distributed laminar air flow during processing. In one embodiment, for example, relatively consistent air flow speeds can be maintained by including the exhaust duct 134c having a cross-sectional area substantially equal to the area of the intake slot 138 formed in the exhaust plenum 132. In another embodiment, if both exhaust ducts 134a and 134b are included in the system 100, the sum of the cross-sectional area of the exhaust ducts 134a and 134b can be substantially equal to the area of the intake slot 138 and the cross-sectional area of the exhaust duct 134c. In a specific example, a cross-sectional dimension (e.g., diameter) of the exhaust duct 134c can be about 4 inches with a corresponding cross-sectional area of about 12.6 inches$^2$. In this example, the exhaust ducts 134a and 134b can have cross-sectional dimensions (e.g., diameter) of approximately 2.8 inches. Also in this example, the intake slot 138 can have dimensions (e.g., length, height) of about 42 inches and about 0.3 inches. In other embodiments, the intake slot 138 and the exhaust ducts 134a-c can have other dimensions and/or configurations, and the disclosure is not limited by the specific examples used herein.

The system 100 can also include a controller 104 (shown schematically) configured to control movement of the arm 112 along the second axis Y and to control movement of the focus carriage 128 relative to the material processing area 102. More specifically, the focus carriage 128 is configured to move in a coordinated manner along the arm 112 in a direction generally parallel with the first axis X. Further, as discussed previously, the arm 112 itself can move along the rails 114a and 114b in a direction generally parallel to the second axis Y. Because the exhaust plenum 132 extends generally parallel with the first axis X along a length $L_2$ at least the length of travel of the focus carriage 128, the laser beam 122 and the exhaust plenum 132 can be directed to any desired X, Y coordinate on the material processing area 102.

As illustrated in FIG. 1A, the focus carriage 128 can also include a smoke deflector 160 for deflecting contaminants generated by the focused laser beam 122 as the beam irradiates a workpiece (not shown). Specifically, the smoke deflector 160 is configured to prevent the smoke and other contaminants from rising toward the focus carriage 128, and guide the smoke in a direction toward the intake slot 138.

Figure 1C:
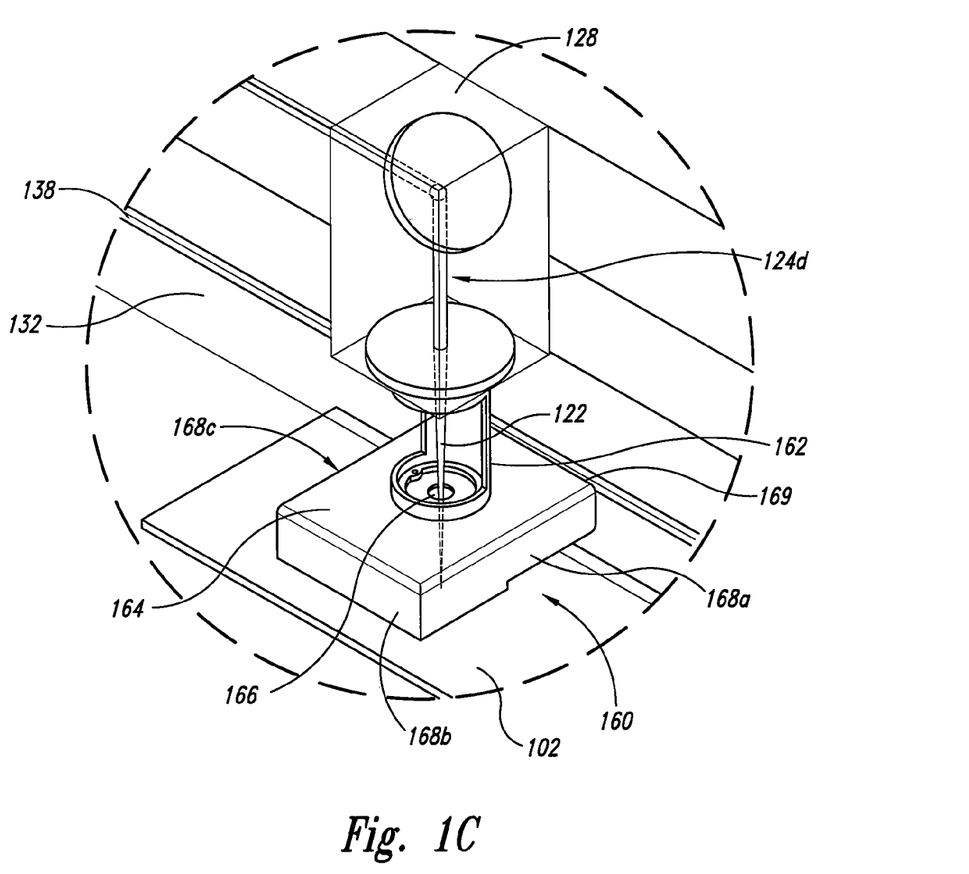
FIG. 1C is an enlarged view of the area 1C of FIG. 1A illustrating a smoke deflector mounted to a focus carriage configured in accordance with an embodiment of the disclosure.

FIG. 1C is an enlarged view of the area 1C of FIG. 1A illustrating the smoke deflector 160 mounted to the focus carriage 128 and configured in accordance with an embodiment of the disclosure. As illustrated, the smoke deflector 160 can include (a) a vertical support 162 configured to extend from the focus carriage 128 toward the material processing area 102 and (b) a deflection guide 164 attached to the vertical support. In one embodiment, the vertical support 162 can be mounted to a portion of the focus carriage 128 facing the material processing area 102. In some arrangements, the vertical support 162 can surround or partially surround, but not impinge, the laser beam 122 as it exits the focus carriage 128. In other arrangements, the vertical support 162 may include a plurality of support pillars configured to extend from the focus carriage 128 toward the material processing area 102. The vertical support 162 may be formed of any lightweight, rigid, heat and/or fire resistant material (e.g., aluminum) that allows the focus carriage to move rapidly during use.

As illustrated in FIG. 1C, the deflection guide 164 can be a heat and/or fire resistant plate supported by the vertical support 162 at a selected distance above the material processing area 102 such that the deflection guide 164 is directly impacted by the flow of smoke and other contaminants generated during laser-based processing of a workpiece (not shown). The deflection guide 164 can be shaped to deflect the contaminants from rising toward the focus carriage 128 or other optical and/or motion system components. In one embodiment, the deflection guide 164 is a plate having a hole or aperture 166 positioned in the beam path 124d such that the focused laser beam 122 passes through the hole 166 of the deflection guide 164. In some arrangements, the deflection guide 164 can be substantially rectangular. One of ordinary skill in the art, however, will recognize that the deflection guide 164 can have other shapes and dimensions (e.g., circular, triangular, concave, etc.). Additionally, the deflection guide 164 can be any size suitable for deflecting the particular smoke generated during material processing. Smoke characteristics can depend, for example, on the size of the system 100, the type of laser source 121, and/or the material characteristics of the workpiece, etc.

The deflection guide 164 may also include side walls 168a-c (collectively referred to as 168) for facilitating the capture and retention of smoke proximal to a point of smoke generation. As illustrated, the side walls 168a-c can be arranged on three sides of a rectangular-shaped defection guide 164. In the illustrated embodiment, the deflection guide 164 does not include a side wall 168 on a back edge 169 of the deflection guide 164 adjacent to the exhaust plenum 132. In this arrangement, the smoke and other contaminants can be directed into the intake slot 138 of the exhaust plenum 132 positioned adjacent to the smoke deflector 160. In one embodiment, the deflection guide 164 can be positioned approximately horizontal with respect to the material processing area 102. In another embodiment, the defection guide 164 can be positioned at an angle inclined toward the exhaust plenum 132 for guiding contaminants toward the intake slot 138.

Smoke, debris and other fumes can be a major concern when using laser-based material processing systems. Accordingly, exhausting assemblies and methods for exhausting laser-based material processing systems are necessary to protect the optical and moving elements in the system. As noted above, some conventional exhaust systems use low-pressure, high-volume vacuum exhaust blowers to drive a curtain of air from a fresh air intake slot at one end of the housing and across the entire surface of a workpiece to an exhaust manifold on an opposite end of the housing. Using such statically positioned exhaust systems requires powerful and large exhaust blowers in order to move sufficient air to efficiently remove potential contaminants before contamination can occur. However, there is a continuous drive in the industry to increase the field size of the material processing area to accommodate larger and/or more workpieces for processing. This increase in size can put large demands on the size (e.g., 8-13 inch exhaust wheels) and power requirements (e.g., 3-4 horsepower motors) of the exhaust blowers. For example, because the exhaust manifold and ducts are located on one wall of the housing enclosure and not directly adjacent to the site of material processing, and because the efficiency of smoke extraction directly correlates with the proximity of the site of material processing, the field size of the material processing area must be limited in order to prevent contamination from rising smoke and fumes.

Also as noted above, some conventional exhausting systems rely on high-vacuum pressure, low-flow exhaust blowers to pull smoke and debris through a flexible exhaust hose attached directly to the focus carriage. The high vacuum pressure exhaust blowers are required to achieve the air exhaust velocities necessary to capture smoke quickly at a point directly adjacent to the point of material processing. Typically the nozzle of the exhaust hose is typically attached directly to the focus carriage and configured to move with the focus carriage to ensure that the exhaust hose is correctly positioned. However, in addition to a drive to increase the field size of the laser processing system, there is also a continuous drive to increase laser processing speed. To achieve this speed, laser positioning systems are becoming smaller and lighter weight. An exhaust hose that must be pulled by the focus carriage adds significant weight and drag to the focus carriage, thus increasing the weight and reducing the positioning speed of the motion system.

In contrast to the restricted field size when employing conventional, statically positioned exhaust systems, the system 100 including the exhaust assembly 130 described above is expected to efficiently remove contaminants from the point of laser processing, and therefore, the exhaust assembly 130 has little or no effect on the size of the material processing field. Because the exhaust plenum 132 extending along the X axis travels with the arm 112 along the Y axis rather than being fixed on a wall of the housing, the exhaust plenum 132 is positioned substantially adjacent to the focus carriage 126 and positioned to exhaust smoke at any desired X and Y coordinates within the material processing area.

Another advantage of the system 100 including the exhaust assembly 130 described above is that the moveable exhaust plenum 132 is not directly attached to of the laser beam focus carriage 126. In contrast to conventional systems that employ cumbersome exhaust and/or vacuum nozzles carried by the focus carriage, the system 100 can use a small, lightweight focus carriage 126 that is not impeded by such additional structures. Accordingly, the focus carriage 126 is expected to operate at significantly higher processing speeds than conventional focus carriages. Additionally, because the exhaust plenum 132 extends across the arm 112 and is configured to pull smoke and vapors across the entire length of travel of the focus carriage 126, the system 100 can employ a low-vacuum, high-volume vacuum source 136 that is expected to result in cost and maintenance savings.

A further advantage of the system 100 including the exhaust assembly 130 is that smoke and debris removal can be assisted by the smoke deflector 160. By using passive means, such as smoke deflection, the contaminants generated at the material processing site are guided toward and into the intake slot 138 of the adjacently positioned exhaust plenum 132. Furthermore, the smoke deflector 160 can significantly impede the flow of smoke and fumes toward the optical components housed in the focus carriage 128 directly above the site of material processing. This can help prevent and/or minimize expensive and time-consuming maintenance on these components.

Figure 2:
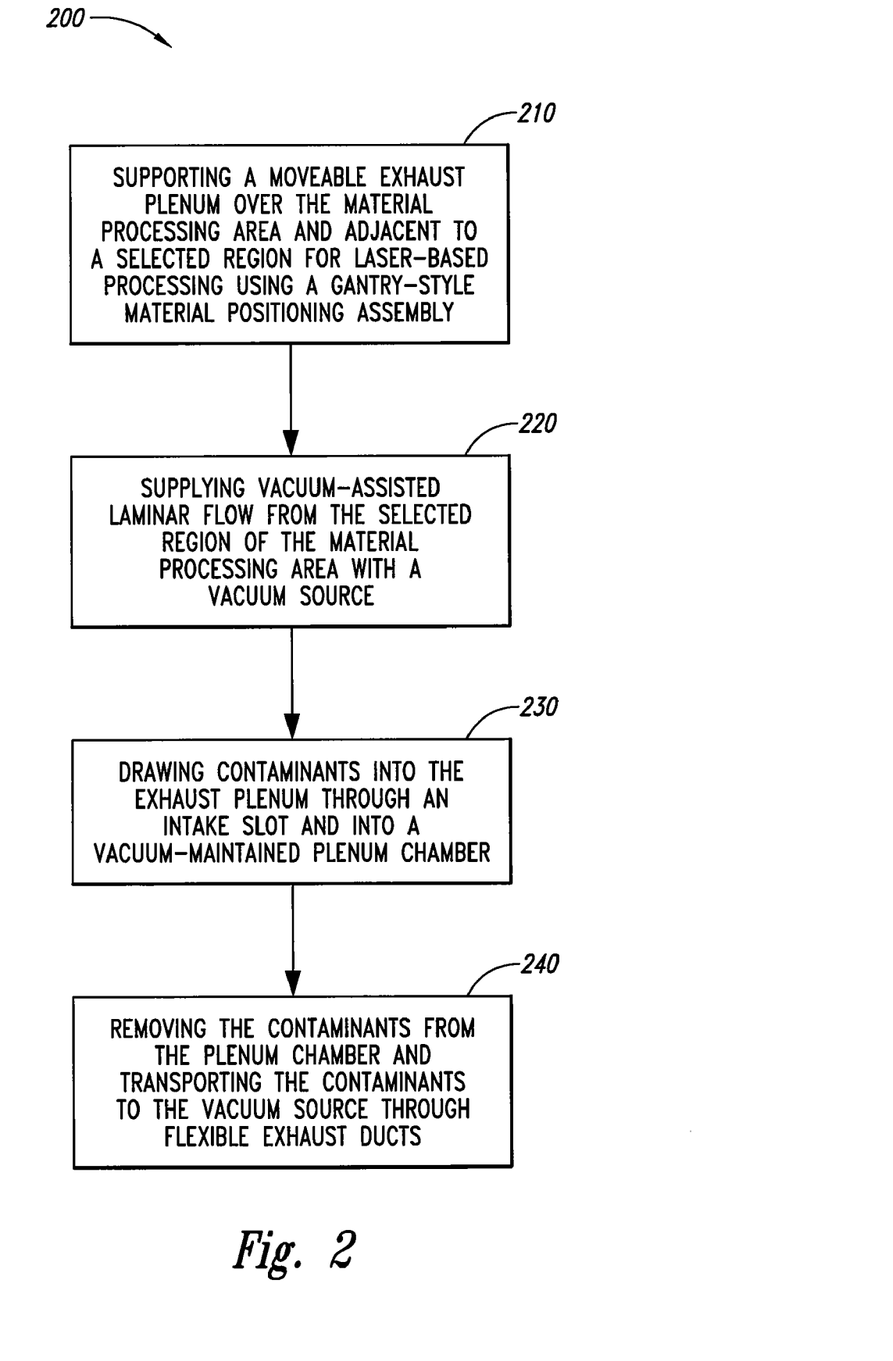
FIG. 2 is a flow chart illustrating a method for exhausting a material processing area of a laser-based material processing system in accordance with an embodiment of the disclosure.

FIG. 2 is a flow chart illustrating a method 200 for exhausting a material processing area of a laser-based material processing system in accordance with an embodiment of the disclosure. The method 200 can be performed, for example, using the system 100 described above or other suitable laser-based material processing systems. The method 200 can include supporting a moveable exhaust plenum over the material processing area and adjacent to a selected region for laser-based material processing using a gantry-style positioning assembly (block 210). In one embodiment, the positioning assembly can have an arm configured to move along a first axis and extend along a second axis generally normal to the first axis. The moveable exhaust plenum can be carried by the arm and extend lengthwise in a direction generally parallel with the second axis. The method 200 can further include supplying vacuum-assisted laminar flow from the selected region of the material processing area with a vacuum source (block 220). The vacuum source can be in fluid communication with the moveable exhaust plenum. Additionally, the method 200 can include drawing contaminants into the moveable exhaust plenum through an intake slot and into a vacuum-maintained plenum chamber (block 230). In one embodiment, the intake slot extends along the exhaust plenum across approximately the entire material processing area. After block 230, the method 200 can further include removing the contaminants from the plenum chamber and transporting the contaminants to the vacuum source through flexible exhaust ducts (block 240). The flexible exhaust ducts can be operably coupled to the arm and configured to move with the exhaust plenum along the first axis.

Figure 3:
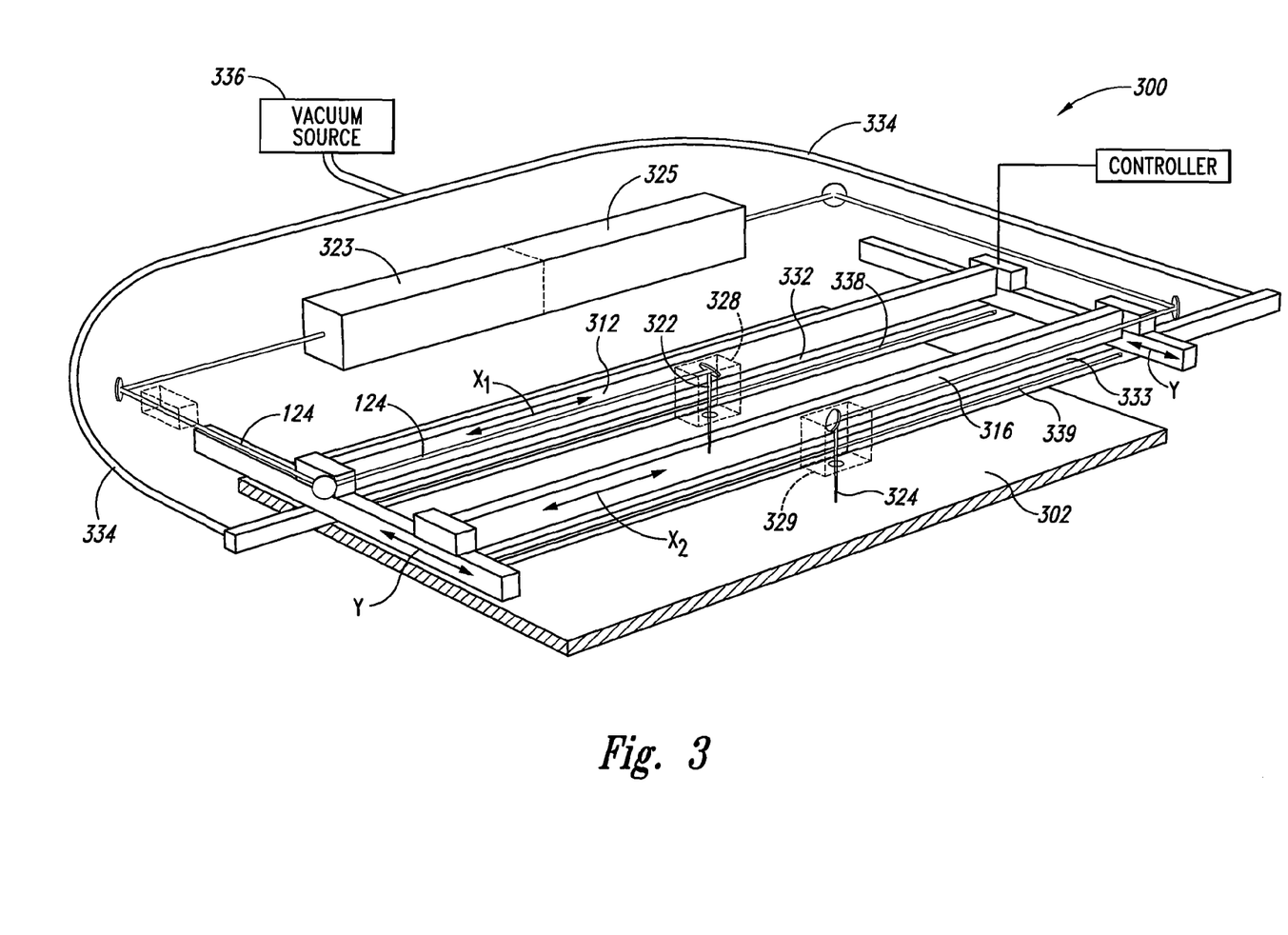
FIG. 3 is a partially schematic, isometric view illustrating a laser-based material processing system including an exhaust assembly configured in accordance with another embodiment of the disclosure.

C. Additional Embodiments of Laser-Based Material Processing Exhaust Systems and Methods for Using Such Systems FIG. 3 is a partially schematic, isometric view illustrating a laser-based material processing system 300 including an exhaust assembly 330 configured in accordance with another embodiment of the disclosure. This system 300 can include several features generally similar to the system 100 described above with respect to FIGS. 1A and 1B. The system 300 differs from the system 100, however, in that the system 300 includes a positioning assembly 310 having a different configuration that the positioning assembly 110 (FIG. 1A). More specifically, the positioning assembly 310 includes a first moveable arm 312 carried by two generally parallel, stationary rails or guides 314 (shown as a first rail 314a and a second rail 314b). The first arm 312 extends along a first axis $X_1$ and the two rails 314a and 314b each extend along the second axis Y. The positioning assembly 310 further includes a second arm 316 carried by the rails 314a and 314b. The second arm 316 extends along a third axis $X_2$ generally parallel to the first axis $X_1$. The first and second arms 314 and 316 can each move back and forth along the rails 314a and 314b in a direction generally parallel with the second axis Y. In the illustrated embodiment, a first laser beam focus carriage 328 and a first exhaust plenum 332 are carried by the first arm 312, and a second laser beam focus carriage 329 and a second exhaust plenum 333 are carried by the second arm 316.

As shown in FIG. 3, the first laser beam focus carriage 328 can direct a first laser beam 322 generated from a first stationary laser source 323 toward a material processing area 302, and the second laser beam focus carriage 329 can direct a second laser beam 324 generated from a second stationary laser source 325 toward the material processing area 302. Accordingly, the first and second laser beams 322 and 324 can be configured to irradiate different portions of a workpiece simultaneously. In one embodiment, the first and second laser beams 322 and 324 can be configured to process first and second portions, respectively, of a workpiece (not shown). In another embodiment, the first laser beam 322 can be configured to irradiate the workpiece in a first processing step and the second laser beam 324 can be configured to irradiate the workpiece in a second processing step that follows the first processing step. One of ordinary skill in the art will recognize that the laser beams 322 and 324 can operate sequentially or simultaneously on one or more workpieces at least proximate to the material processing area 302.

In the embodiment shown in FIG. 3, the first exhaust plenum 332 is attached to the first arm 312 and positioned to exhaust contaminants generated from processing the workpiece (i.e., cutting, etching, marking, etc.) by the first laser beam 322. For example, the first exhaust plenum 332 has a first intake slot 338 generally orientated toward the first laser beam 322 and configured to receive contaminants generated by the first laser beam 322 at least proximate to the material processing area 302. Further, the second exhaust plenum 333 is attached to the second arm 316 and positioned to exhaust contaminants generated from processing the workpiece by the second laser beam 324. For example, the second exhaust plenum 333 has a second intake slot 339 generally orientated toward the second laser beam 324 and configured to receive contaminants generated by the second laser beam 324 at least proximate to the material processing area 302. The first and second plenums 332 and 333 can be in fluid communication with the same vacuum source 336 or, in another embodiment, with different vacuum sources. Additionally, the first and second exhaust plenums 332 and 333 can be in fluid communication with each other via exhaust ducts 334.

From the foregoing, it will be appreciated that specific embodiments of the disclosure have been described herein for purposes of illustration, but that various modifications can be made without deviating from the spirit and scope of the disclosure. For example, although many of the embodiments are described herein with respect to laser-based material processing systems, other types of laser beam positioning systems (e.g., laser printers, CD players, CD-ROM devices, aiming/leveling devices, spectrometers, stereo lithography equipment, laser pointers, laser scanners, etc.) may be within the scope of the disclosure. Moreover, specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, embodiments of the disclosure are not limited except as by the appended claims.

We claim:

1. A laser-based material processing system, the system comprising:
    a radiation source configured to produce a laser beam and direct the laser beam along a beam path toward a material processing area;
    a positioning assembly over at least a portion of the material processing area, the positioning assembly including an arm configured to move along a Y axis, wherein the arm extends along an X axis generally normal to the Y axis;
    a laser beam focus carriage carried by the arm and including one or more optical elements in the beam path to direct and focus the laser beam toward the material processing area;
    an exhaust assembly configured to remove contaminants from the material processing area and move the contaminants toward a remote location, the exhaust assembly including:
        a vacuum source;
        an exhaust plenum carried by the arm and extending lengthwise in a direction generally parallel with the X axis, the exhaust plenum having an intake slot facing the laser beam focus carriage and extending along the exhaust plenum across at least a portion of the material processing area, the intake slot being positioned to receive contaminants generated during material processing; and
        one or more flexible exhaust ducts in fluid communication with the vacuum source and the exhaust plenum.

2. The system of claim 1 wherein:
    the arm has an upper portion facing away from the material processing area and a lower portion facing the material processing area;
    the exhaust plenum includes a generally rectangular exhaust chamber coupled to the lower portion of the arm above the material processing area;
    the intake slot extends through a wall of the exhaust chamber facing the laser beam focus carriage and along the exhaust plenum across approximately the entire material processing area; and
    one or more flexible exhaust ducts are carried by the arm and in fluid communication with the exhaust chamber.

3. The system of claim 1 wherein:
the arm has an upper side facing away from the material processing area and a lower side facing the material processing area, and wherein the arm has a first side and a second side facing opposite from the first side, wherein the first and second sides are generally normal to the upper and lower sides;
the laser beam focus carriage is carried by the first side of the arm and configured to move along the arm in a direction generally parallel with the X axis to position the laser beam focus carriage at desired X and Y coordinates on the material processing area; and
the exhaust plenum is coupled to the lower portion of the arm and carried by the arm along the Y axis to position the intake slot at desired Y coordinates on the material processing area.

4. The system of claim 1, further comprising a controller operably coupled to the positioning assembly and the laser beam focus carriage, the controller being configured to move the arm and the laser beam focus carriage relative to the material processing area such that (a) the laser beam is directed toward a first portion of the material processing area, and (b) the exhaust plenum draws contaminants from the first portion.

5. The system of claim 1 wherein:
the laser beam focus carriage is configured to travel along the arm over a first distance in a direction generally parallel with the X axis to position the laser beam focus carriage at desired X and Y coordinates on the material processing area; and
the intake slot extends lengthwise along the exhaust plenum a distance approximately equal to or greater than the first distance.

6. The system of claim 1, further comprising a contaminant deflector carried by the laser beam focus carriage and positioned to deflect contaminants generated during material processing toward the intake slot.

7. The system of claim 6 wherein the contaminant deflector further comprises:
a vertical support extending from the laser beam focus carriage toward the material processing area; and
a deflection guide attached to the vertical support, the deflection guide comprising a plate positioned generally parallel with the material processing area, the plate having a hole aligned with the beam path.

8. The system of claim 7 wherein the deflection guide further comprises one or more side walls extending from the plate toward the material processing area, and wherein the one or more side walls are at least approximately normal to the plate.

9. The system of claim 1 wherein:
the arm is a first arm extending along a first X axis, and wherein the positioning assembly further comprises a second arm positioned to move along the Y axis, the second arm extending along a second X axis generally normal to the Y axis and generally parallel with the first X axis;
the laser beam focus carriage is a first laser beam focus carriage carried by the first arm, and wherein the system further comprises a second laser beam focus carriage carried by the second arm and including one or more optical elements in a second beam path to direct and focus a second laser beam toward the material processing area; and
the exhaust plenum is a first exhaust plenum carried by the first arm, and wherein the exhaust assembly further comprises a second exhaust plenum carried by the second arm and extending lengthwise in a direction generally parallel with the second X axis, the second exhaust plenum having a second intake slot facing the second laser beam focus carriage and extending along the second exhaust plenum across at least a portion of the material processing area, the second intake slot being positioned to receive the contaminants generated during material processing.

10. The system of claim 1 wherein the exhaust plenum is composed of aluminum, and wherein the flexible exhaust duct is a flexible exhaust hose operatively connected to the exhaust plenum.

11. The system of claim 1 wherein the exhaust plenum includes one or more exhaust duct attachment sites for coupling to a first end of the exhaust duct, and wherein the vacuum source includes at least one exhaust duct attachment site for coupling to a second end of the exhaust duct.

12. The system of claim 1, wherein the exhaust plenum, the one or more flexible exhaust ducts and the vacuum source comprise an exhaust path, and wherein:
the exhaust plenum is in fluid communication with (a) a first exhaust duct at a first plenum attachment site and (b) a second exhaust duct at a second plenum attachment site;
the first exhaust duct is in fluid communication with the second exhaust duct at a duct junction;
the duct junction is positioned in the exhaust path before the vacuum source; and
the exhaust path includes a third exhaust duct extending between the duct junction and the vacuum source.

13. The system of claim 1 wherein the vacuum source includes an exhaust blower.

14. The system of claim 13 wherein the exhaust blower is a low-pressure, high-volume exhaust blower.

* * * * *